Patented Nov. 19, 1929

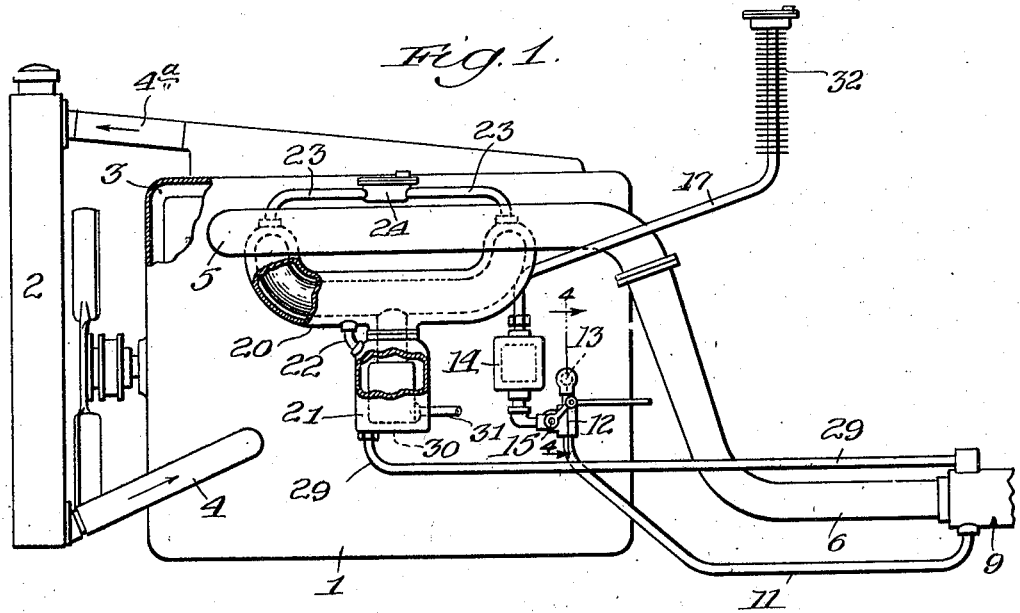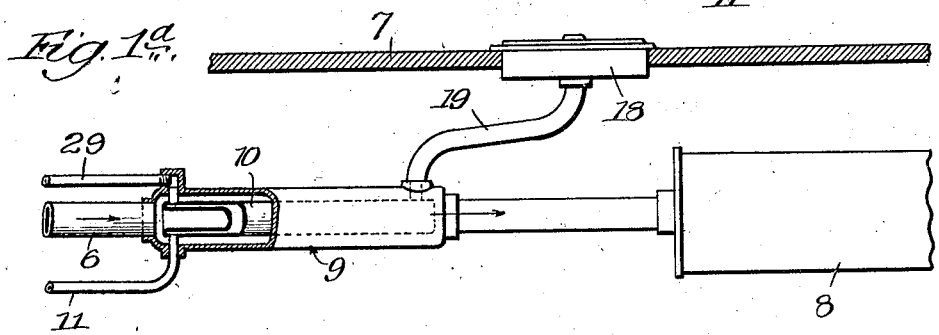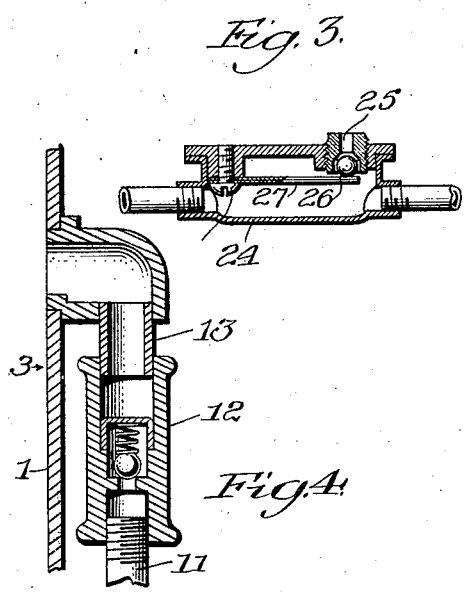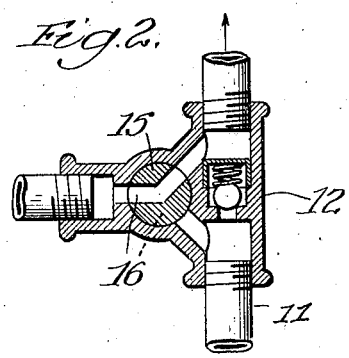

1,736,003

UNITED STATES PATENT OFFICE

JOHN H. GOULD, OF DETROIT, MICHIGAN, ASSIGNOR TO McCORD RADIATOR & MFG. CO., OF DETROIT, MICHIGAN, A CORPORATION OF MAINE

STEAM-HEATED FUEL INTAKE FOR INTERNAL-COMBUSTION ENGINES

Application filed January 3, 1927. Serial No. 158,476.

This invention relates to means which during the operation of a vehicle or other internal combustion engine will supply steam about the fuel intake element of the engine so as to heat the incoming fuel mixture for the purpose of thoroughly vaporizing the liquid fuel and thus insure better engine operation, and more particularly when the motor is warming up at the time of starting.

In my copending application, filed December 30, 1926, Serial No. 158,114, I have shown and described and claimed a steam generator heated by the exhaust gases of the engine and connected with a heater assembly associated with the body of the vehicle for car warming purposes. It is one of the objects of the invention of this present application to utilize the steam generated in such a generator to also heat the fuel intake element, such as either the fuel intake manifold or the carbureter or both, for the purpose of obtaining a more efficient combustible mixture.

A further object of my invention is to jacket both the intake manifold and the carbureter so as to receive the steam from the generator for heating these parts and maintaining them at a substantially constant surrounding temperature.

Other and further objects of my invention will appear from the following specification taken in connection with the accompanying drawings, in which—

Figs. 1 and 1ª are views showing my invention as applied to the manifold and carbureter of an internal combustion engine;

Fig. 2 is a sectional view through the valve fixture associated with the means for supplying water from the cooling system of the engine to the steam generator;

Fig. 3 is a sectional view through the vent for the connected jackets of the manifold and carbureter, respectively, and Fig. 4 is an enlarged vertical sectional view taken on line 4—4 of Fig. 1.

In the drawings, 1 indicates an internal combustion engine of the type usually employed on motor vehicles and having a radiator 2 in front of the same as a part of the cooling system of the engine, said radiator being connected with the water jacket 3 of the engine by suitable conduits 4, 4ª, as customary in assemblies of this general kind. The engine has an exhaust manifold 5, to which is connected an exhaust pipe 6, the latter leading back under the floor 7 of the vehicle and terminating in a muffler 8, as usual in motor vehicle design.

Associated with the exhaust pipe 6 is a steam generator 9 containing a steam forming chamber 10 to be heated by the exhaust gases of the engine passing through said generator in contact with the walls of said chamber, as in my copending application as aforesaid. The chamber 10 is supplied with water from the cooling system of the engine through a pipe or conduit 11 connected at one end with the liquid inlet end of the chamber 10 and at the other end with the water jacket of the engine through a valve fitting 12 and associated pipe connection 13 (see Fig. 4). A water trap 14 is connected with the valve fitting 12 by a pipe connection 12ª so as to supply measured quantities of water to the steam chamber 10 of the generator on turning the plug 15 in said fitting, as in my said copending application.

The valve fitting 12 is shown in section in Fig. 2. As shown, the plug 15 has a passage 16, which when in the position shown in full lines in said figure opens the water jacket to the trap 14 and supplies the same with water, the latter rising in the pipe 17 extending above the trap. When the plug 15 is turned to place the passage 16 in communication with the pipe 11, the trap 14 is opened to pipe 11 for supplying the chamber 10 with water for steam producing purposes, all as in my said copending application.

Set in the floor 7 of the car is a heater assembly 18 containing conduits to which steam is supplied from chamber 10 through a connecting pipe 19. This heater is described and illustrated in detail in said copending application.

As shown in Fig. 1, the engine 1 has a jacketed intake manifold 20 and a jacketed carbureter 21. The jackets of these elements are connected for communication in any suitable way, a short pipe section 22 being shown for the purpose in Fig. 1. These communicating jackets have a common vent pipe 23 preferably connected to the jacket of the manifold. This pipe is above the manifold and contains a chamber 24 having a vent opening 25 to the atmosphere. This opening is controlled by a thermally operated valve 26 actuated by a thermal bar 27 secured inside of the chamber 24 by a screw 28 or other means, as indicated in Fig. 3. Normally the valve 26 is open.

The jacket of the carbureter 21 is connected by a pipe 29 with the steam producing chamber 10 above the water inlet connection thereof. Steam produced in the chamber 10 during the operation of the engine 1 is supplied both to the heater 18 and to the jackets of the intake manifold and carbureter 20, 21, respectively. This will cause the manifold and carbureter to be heated to a temperature far above that of the incoming gas and air supply and thus raise the temperature of the latter to produce a more efficient fuel mixture by more thoroughly vaporizing the liquid fuel. This is especially advantageous when the motor is warming up, as when on starting. Moreover, this produces a uniform temperature surrounding the fuel intake parts and makes for better motor performance with economy of fuel consumption.

The air in the jackets of the manifold and carbureter, respectively, on rising of the steam from the generator, as when starting, will be forced out of the vent opening 25 and escape to the atmosphere. As soon as steam reaches the valve 26, its high temperature will act on the bar 27 to close the valve 26 and thus prevent the escape of steam. The carbureter 21 has an air intake port, indicated generally at 30, and a liquid fuel supply pipe 31.

Instead of both the intake manifold 20 and the carbureter 21 being jacketed so as to be heated by steam, only one of these devices may be jacketed. The pipe 29 opens into the lower end of the jacket of the carbureter and is generally below the same so that any condensate in said pipe or jackets may drain back into the chamber 10.

The pipe 17 leading from the trap 14 connects with a condenser 32, which extends above the liquid level in the cooling system, and the condenser has a valve controlled vent chamber 25 at its upper end, in the same manner as in my said copending application.

The details of structure shown and described may be variously changed and modified without departing from the spirit and scope of my invention.

I claim as my invention:

1. The combination with an internal combustion engine having a liquid cooling system for said engine, a steam supply, a conduit connecting the steam supply with the jacket of said element for supplying steam to the jacket for heating said element, an atmospheric vent for said jacket, a valve for said vent, and thermal means responsive to the temperature of the steam reaching the vent to actuate the valve to close the vent.

2. The combination with an internal combustion engine, of a jacketed intake manifold for said engine, a steam supply furnished by the engine, a conduit connecting the jacket of said manifold with the steam supply for supplying steam to the jacket for heating said manifold, an atmospheric vent for said jacket, a valve for said vent, and thermal means responsive to the temperature of the steam reaching the vent to actuate the valve to close the vent.

3. The combination with an internal combustion engine having a liquid cooling system, of a jacketed fuel intake element for the engine, a steam generator supplied with liquids from the cooling system and heated by the exhaust gases furnished by the engine, a conduit connecting the jacket of said element with the generator for supplying steam to the jacket for heating said element, an atmospheric vent for the jacket, a valve for said vent, and thermal means responsive to the temperature of the steam reaching the vent to actuate the valve to close the vent.

4. The combination with an internal combustion engine having a liquid cooling system, of a jacketed fuel intake element for the engine, a steam generator heated by the exhaust gases of the engine, a passage connecting the generator with the cooling system for supplying liquids to the generator, a trap and a valve means included in said passage for controlling the amounts of liquids supplied to the generator from the cooling system, a conduit connecting the jacket of said element with the generator for supplying steam to the jacket for heating said element, an atmospheric vent for said jacket, a valve for said vent, and thermal means responsive to the temperature of the steam reaching said vent for actuating the valve to close the vent.

5. The combination with an internal combustion engine having a liquid cooling system, of a jacketed fuel intake element for the engine, a steam generator supplied with liquids from the cooling system and heated by the exhaust gases furnished by the engine, a steam connection between the lower portion of the jacket of said element and the generator for supplying steam to the jacket for heating said element and for the return of condensate to the generator, an atmospheric vent for said jacket, a valve for said vent, and thermal means responsive to the temperature of the steam reaching said vent for actuating the valve to close the vent.

In testimony whereof I affix my signature this 28th day of December, 1926.

JOHN H. GOULD.